United States Patent [19]

Zetterlund

[11] Patent Number: 4,724,088
[45] Date of Patent: Feb. 9, 1988

[54] SCRAPING DEVICE IN A SETTLING BASIN

[76] Inventor: Leif Zetterlund, Älgerumsvägen 16, S-383 00 Mönsterås, Sweden

[21] Appl. No.: 914,827

[22] PCT Filed: Jan. 29, 1986

[86] PCT No.: PCT/SE86/00033
§ 371 Date: Sep. 24, 1986
§ 102(e) Date: Sep. 24, 1986

[87] PCT Pub. No.: WO86/04256
PCT Pub. Date: Jul. 31, 1986

[30] Foreign Application Priority Data

Jan. 29, 1985 [SE] Sweden ................... 8500395

[51] Int. Cl.⁴ ..................... B01D 21/04; B01D 21/20
[52] U.S. Cl. ......................... 210/803; 210/525
[58] Field of Search ............ 210/525, 803, 776, 540, 210/541, 767, 800

[56] References Cited

U.S. PATENT DOCUMENTS 1,918,742 7/1933 Elrod .................. 210/525
2,160,534 5/1939 Briggs ................. 210/525

FOREIGN PATENT DOCUMENTS 0076240 12/1981 European Pat. Off. .
04257 5/1983 World Int. Prop. O. .
423968 6/1982 Sweden .
1504518 3/1974 United Kingdom .

Primary Examiner—Frank Sever

[57] ABSTRACT

The present invention relates to a scraping device in a settling basin. The scraping device removes sediments, which accumulate on the bottom of the basin. It comprises a vehicle and a scraper on the vehicle. A cable drive device having a pull cable pulls the vehicle forwards and backwards along the bottom of the basin. The scraper assumes, in one of the vehicle's two directions of movement, a working position, in which it is directed towards the bottom of the basin, in order to scrape sediments to an output area, and in the vehicle's opposite direction a passive return position, in which it is elevated from the bottom of the basin.

9 Claims, 6 Drawing Figures

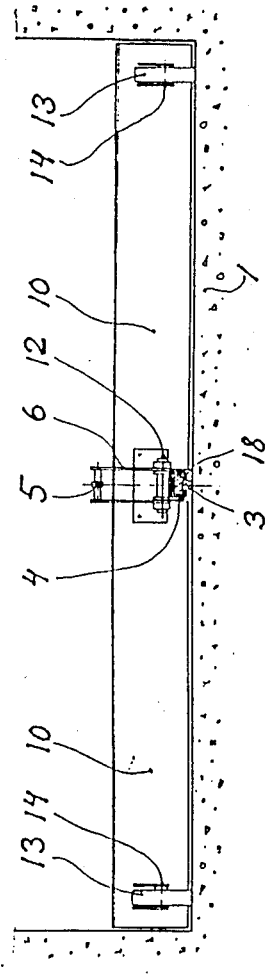
FIG. 2
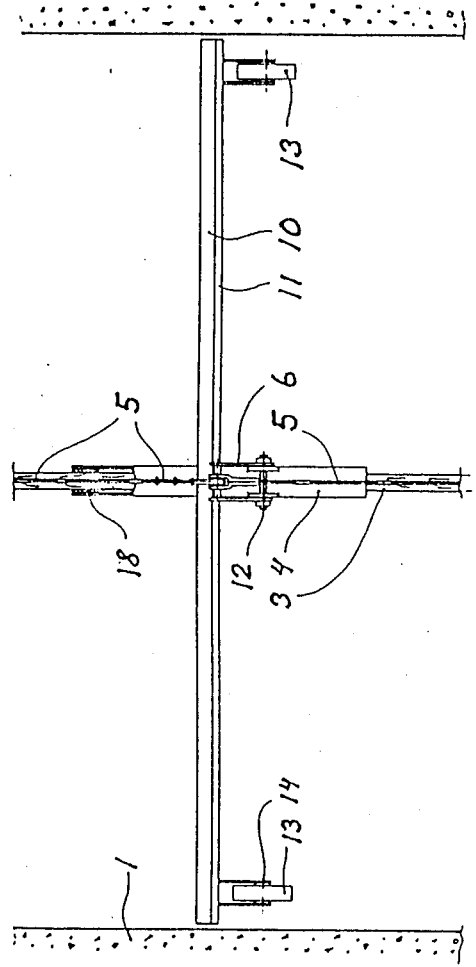
FIG. 3
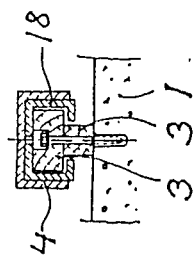
FIG. 4
FIG. 5

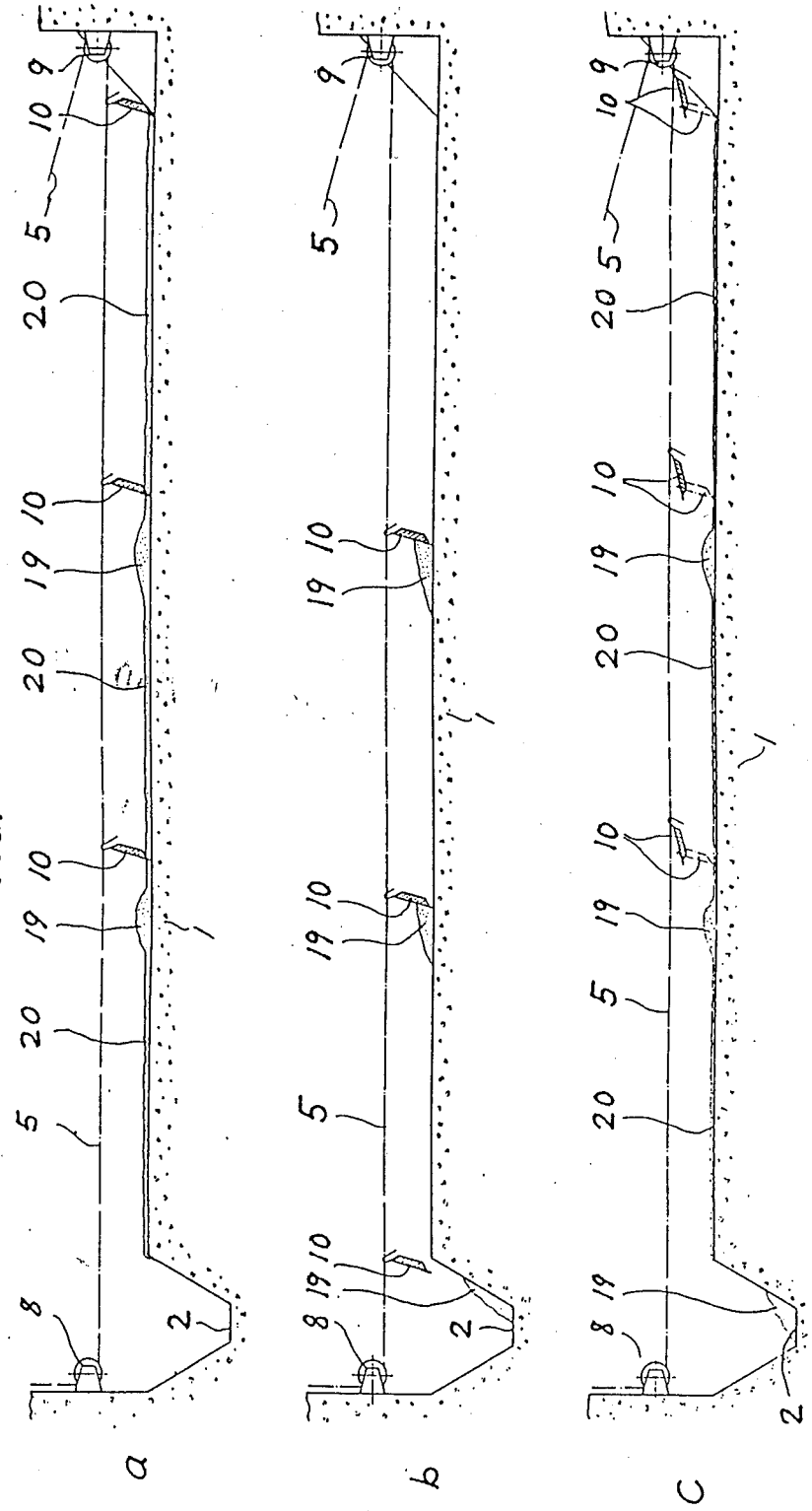

SCRAPING DEVICE IN A SETTLING BASIN

KNOWN ART

Known scraping devices for removal of sediments in rectangularily shaped settling basins are rather complicated structures having a plurality of movable parts.

Swedish allowed patent application No. 8302563-5 relates to a quite simple scraping device, which includes a vehicle, on which two scraping blades adjacent each other are pivotally disposed. Shoulders, which are arranged at the turning points of the vehicle, turn the scraping blades into their intended positions, either an active scraping position or an elevated passive idle or return position. The pull cable is connected partly to one of the gable-ends of the vehicle and partly to its other gable-end.

DESCRIPTION OF THE INVENTION

One object of the present invention is to build a scraping device, which is simpler than known scraping devices and comprises fewer movable parts.

Another object of the invention is to build a scraping device, which can be connected, in a ready manner, to several scraping devices, which are identical with it and jointly in succession in the direction of movement are capable of removing sediments from the bottom of a settling basin, particularily an extended one.

The scraping device according to the present invention comprises a sledge on a guide on the bottom of a settling basin as well as a carrier, which is rotatably disposed on the sledge and carries a scraping blade into at frist and active working position for sediment scraping towards an output area and then an elevated passive rest or return position, when the scraping device is pulled away from the output area after the working phase. The carrier turns the scraping blade into its intended position, because the pull cable is provided with a holder in the carrier. Thus, the pull cable performs two tasks, partly of pulling the sledge in the working direction and the return directin and partly of lowering the scraping blade at the return points of the scraping device, at first into the working position and then into the return position. The pull cable can accomplish this while pulling and at the same time guiding without any such additional mechanical regulatory devices, which known scraping devices employ.

The sledge, which carries the carrier and the scraping blade attached to the carrier comprises a profiled bar. Its cross section or the cross section of sliding shoes, which are inserted into it, has such a shape, that it cannot be elevated from or run off its guide. The carrier is rotatably disposed around an axle on the sledge. Said axle is horizontally disposed and its direction is perpendicular to the direction of movement of the scraping device. The scraping blade, which is attached to the carrier, is carried to its active working position, when the pull cable pulls the carrier towards the output area of the basin and subsequently to its passive rest and return position, when the pull cable pulls the carrier in the opposite direction, in order not to scrape the amount of sediment, which has been fed or scraped towards the output area, away from the output area or scrape newly settled material in the wrong direction.

In order to prevent the sledge and its carrier and scraping blade from tilting and turning over in relation to the guide, despite the fact that the sledge is retained in its position by the guide thanks to the profiling of the sledge or its sliding shoes, the two ends of the scraping blade are provided with wheels, which support the sledge and the advance of the scraping blade along the bottom of the basin. In case the axles of the wheels were extended towards the sledge, they would coincide with the axle of the carrier on the sledge. Thus, the wheels are always in touch with the bottom of the basin, regardless of what the angle between the scraping blade and the bottom of the basin is.

The inventor was at first not successful with the concept of employing a carrier for the scraping blade and a holder on the carrier for the pull cable due to the fact that the scraping blade was not elevated but was instead locked in its working position, when the pull cable pulled the carrier away from the output area and thus, the scraping device left the output area having its scraping blade in the working position. This problem was solved with a preferred embodiment of the present invention by providing such a large friction between the sledge and the guide, that the scraping blade, by means of its pull cable and carrier, without difficulty, could be brought to its return position without the friction between the sledge and the guide being overcome. When the pulling power exerted on the cable increased subsequent to the turning and the lowering respectively of the scraping blade into the intended position, the friction was at last overcome and the sledge was removed along the guide away from the output area. The artisan knows that the friction in general is from 1.5 to 5 times larger in a rest position than in running and hence, the required friction is not too damaging to the movement of the sledge of the scraping device along its guide.

The required friction can be attained by choosing a suitable material for partly the interior parts of the sledge and partly the guide. Preferably, the sledge is provided with interior sliding shoes at its two ends. The sliding shoes seize the guide in order to keep the sledge on the guide and at the same time they provide such an intimate contact between the sledge and the guide and are made of such a material that the required contact is attained.

In a preferred embodiment of the present invention the scraping blade roughly has the same density as the density of the liquid medium in the settling basin. The force needed to at first lower the scraping blade into its working position and subsequently elevate it into its return position consequently is small and the required least friction between the sledge and its guide correspondingly may be made smaller.

In case the sledge weighs e.g. 100 kg, the pulling force have to be 10 kg subsequent to the starting of the sledge, provided the scraping blade is substantially weightless in the liquid medium in the basin. The pulling force maybe must be 30 kg in order to initiate the movement of the sledge. Apparently, a pulling force of about the same dimension can be used to move the carrier and the scraping blade into their intended working and return position respectively before the start of the scraping device in its working and its return direction respectively.

The desired density of the scraping blade can be attained according to the present invention by one of the following measures:

1. The scraping blade proper is made of a material having a low density, e.g. a tough plastic material having a low density. The low density is attained e.g. by giving the material a certain porosity, in a manner known per se; and 2. The scraping blade can be provided with an extra layer of a material, which is fixed to the blade, the density of the scraping blade and of the extra layer being jointly roughly as large as the density of the liquid medium.

A preferred embodiment of the present invention is to be described more in detail as follows, reference being made to the enclosed drawings. The drawings also relate to a preferred embodiment of a scraping device having a plurality of scrapers according to the invention:

FIG. 2 shows a cross section of the same basin with a view towards its output area;

FIG. 3 is a planar view of the same scraping sledge in its basin;

FIG. 4 shows a cross section of the scraping sledge in FIG. 1-3 and its guide;

FIG. 5 is an elevational view of one end of the same scraping sledge as well as a limit actuator; and FIG. 6 shows three longitudinal sections of a schematically represented settling basin having a scraping device comprising three cooperative scraping sledges according to the invention.

Figure 1:
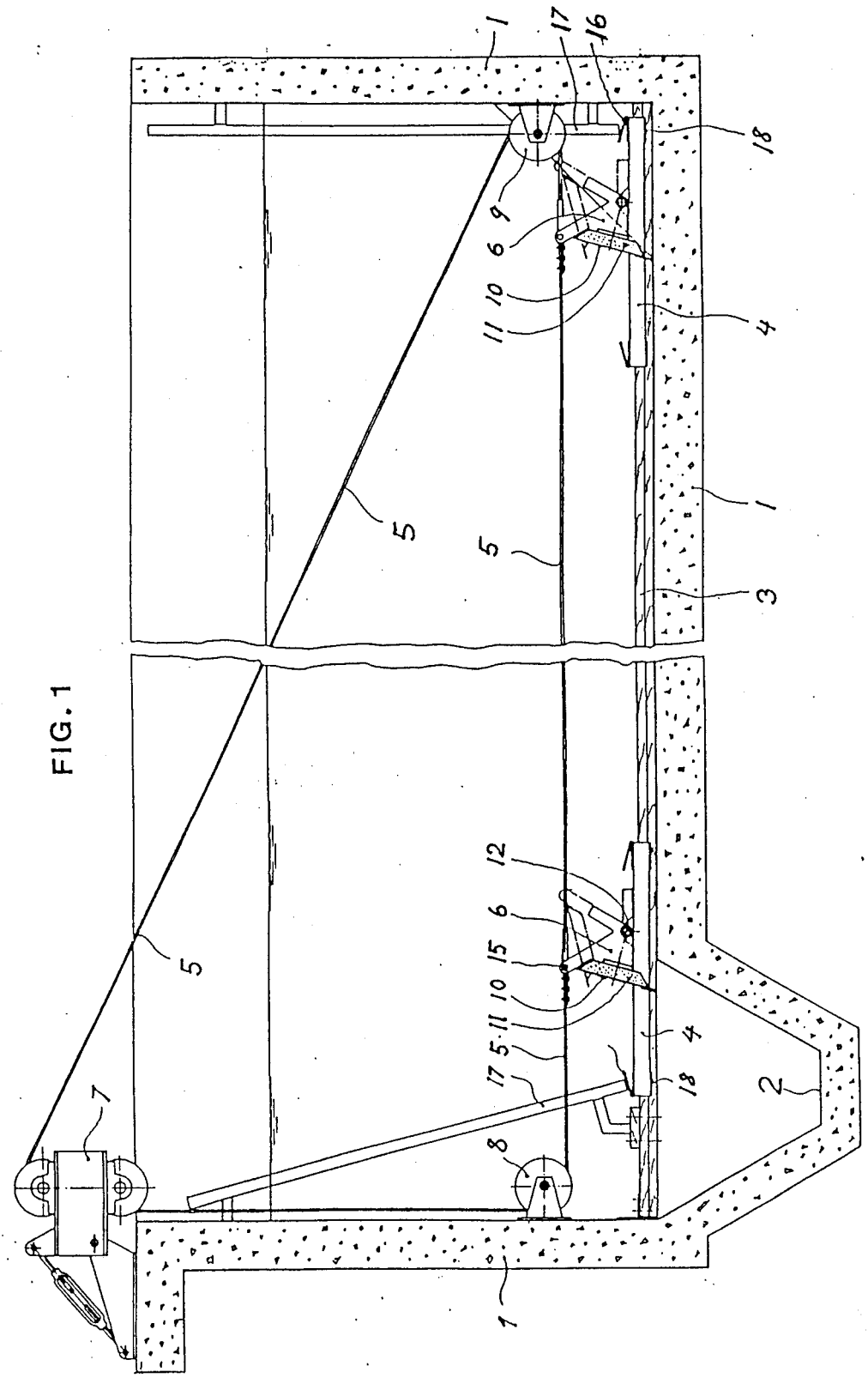
FIG. 1 shows a longitudinal section of a settling basin, partly its end having an output area and partly its opposite end, and it also depicts a sledge according to the invention in its two terminal positions.

FIG. 1 shows a longitudinal section of a settling basin 1. In its left end an output area 2 or a sludge hopper 2 is provided. Along a guide 3 in the middle of basin 1 a scraping sledge 4 is mounted to be moved forwards and backwards by means of a pull cable 5, which is attached to a carrier 6, which is mounted on scraping sledge 4. The pull cable is driven over two separate cable drums in a cable drive device 7, which is mounted above the basin. Cable 5 pulls carrier 6 and scraping sledge 4 via a pulley wheel 8 towards sludge hopper 2 or via pulley wheel 9 towards the opposite end of settling basin 1. A scraping blade 10 is firmly attached to carrier 6 and extends from one longitudinal wall to the other in basin 1 in a direction, which is perpendicular to the direction of pull cable 5. Carrier 6 is rotatably disposed on the sledge around an axle 12 on the sledge and scraping blade 10 can stay in two terminal positions, partly in one working position, when its longitudinal edge touches the bottom of basin 1 and a sediment scraping of the bottom can be performed, and partly in an elevated position, a rest or return position (the scraping blade being depicted by dotted lines), when scraping blade 10 jointly with carrier 6 on sledge 4 returns to the right end of basin 1.

When sledge 4 has arrived at its turning point at sludge hopper 2, a limit actuator 16 on the left end of sledge 4 will contact a limit breaker 17 and drive device 7 change its direction. Sledge 4 is provided with a U-shaped sliding shoe 18 at each end, which seizes guide 3 and at the same time cause friction between sledge 4 and guide 3. Thus, when cable 5 pulls to the right, carrier 6 will initially turn to the right and consequently elevates scraping blade 10 into a rest or return position. Scraping blade 10 is provided with a layer 11 of a plastic foam and consequently the density of scraping blade 10,11 is roughly the same as the density of the liquid medium in the basin and thus, substantially no moment of force is needed to turn scraping blade 10 to the right. Subsequently the friction between the two sliding shoes 18 of sledge 4 and guide 3 must be overcome, before sledge 4 and its carrier 6 and scraping blade 10 can be pulled towards the opposite end of basin 1. A second limit breaker 17 is located here and it is actuated by a second limit actuator 16 on the right end of sledge 4, when the sledge wholly has reached its right end position and consequently drive device 7 changes its direction, cable 5 starts pulling carrier 6 and scraping blade 10 with its plastic layer 11 is lowered towards the bottom of basin 1, since the weight of the scraping blade in the liquid medium substantially can be disregarded. After that sledge 4 is pulled to the left, when the friction between sliding shoes 18 of the sledge and guide 3 is overcome and hence, scraper 4,6,10 is able to perform a new sediment scraping of the bottom of basin 1 towards sludge hopper 2.

FIG. 2 shows scraping sledge 4 and its two sliding shoes 18 on guide 3 and axle 12, around which carrier 6 is rotatably disposed. Carrier 6 carries scraping blade 10, which as depicted assumes its working position, one of its longitudinal edges being in contact with the bottom of basin 1. Two supporting wheels 13 are attached to the two ends of scraping blade 10. If their shafts were to be extended towards axle 12 of the sledge, they would coincide with the latter. Thus, wheels 13 always are in contact with the bottom of basin 1, regardless of what the angle is between scraping blade 10 and the bottom of the basin.

FIG. 3 shows in planar view two scraping devices 4,6,10. Scraping blade 10 has the same position, working position, as in FIG. 2.

FIG. 4 is a vertical cross section of an end of scraping sledge 4, which shows a sliding shoe 18 between guide 3 and sledge 4. The counter pressure of the sledge, which is needed to guide the scraping blade by means of pull cable 5 is attained by friction between the two sliding shoes (only one shown) and guide 3.

FIG. 5 shows the position of a sliding shoe 18 on guide 3 and in one end of scraping sledge 4. It is attached to the interior of scraping sledge 4. This figure also shows one of the two limit actuators 16 on this end of the sledge as well as the lower end of a limit breaker 17.

FIG. 6 shows only schematically three different conditions of an extended scraping construction having three scraping sledges according to the invention, which in succession are connected to a pull cable in the direction of the pull cable.

In 6a one position of scraping blade 10 is shown, in which a sediment scraping commences. Sludge heaps 19 are positioned in front of the two first scraping blades 10 and are the result of a previous scraping advance and new sludge 20 is settling on the bottom of basin 1. In 6b all the scraping sledges with their scraping blades 10 have been moved forwards and the first one has pushed a sludge heap 19 down into sludge hopper 2. In 6c the conditions of sludge heaps 19 are substantially unchanged, but scraping blades 10 have, in their elevated return positions, returned to their starting positions and in the meantime new sludge 20 has started settling on the bottom of basin 1.

What is claimed is:

1. In a device, for moving sludge along the bottom of a basin to a sludge hopper at one end of the basin, having a scraping blade being dragged in a forward direction along the bottom of the basin toward the hopper by a cable and cable drive means thereby scraping the bottom of the basin and depositing sludge in the hopper and the scrapping blade being returned to the opposite end of the basin for beginning another scraping cycle by reversing the cable and cable drive means direction, the improvement wherein the basin includes a guide, secured to and running substantially along the bottom middle longitudinal portion of the basin, which is in frictional engagement with a bottom side of a sledge, a carrier pivotally connected to said sledge on the top side thereof by axle means and being firmly connected with a scraping blade such that said carrier always maintains the blade perpendicular to the cable direction, a wheel being attached to each end of the scraping blade and each wheel having an axis of rotation which coincides with the axis of the axle means, said axle means, via the carrier, allows the blade to pivot about the sledge from a working position, in which the blade is in scraping contact with the basin bottom, to a return position, in which said blade is brought out of engagement with the basin bottom, and the cable drive means being connected to a holding point of the carrier by the cable including means for causing; when the cable is pulled in the forward directions, the scraping blade to be first pivoted to its working position, because of the fricitional engagement between the sledge and the guide, before it begins a scraping cycle, and when the cable is moved in the reverse directon for causing the scraping blade to be first pivoted to its return position, because of the frictional engagement, before it is returned for another scraping cycle, and means for enabling the position of the scraping blade to be changed at any desired location along the guide by only reversing the direction of the cable.

2. A device in accordance with claim 1, wherein the scraping blade roughly has the same density as the density of the liquid medium in the basin.

3. A device according to claim 1, wherein the scraping blade comprises a tough plastic material having a lower density.

4. A device according to claim 1, wherein a plastic foam layer is firmly attached to the scraping blade and the plastic foam layer and the scraping blade together have substantially the same density as the liquid medium in the basin.

5. A device as claimed in claim 1, wherein a plurality of scraping blades are connected along the cable by carriers at a distance from another substantially equal to the distance traveled by the cable in its forward and reverse movement.

6. A device in accordance with claim 1, wherein the sledge has a sliding shoe on each bottom end thereof which is in frictional engagement with said guide.

7. A device according to claim 1, wherein the sledge includes a limit actuator at each end of the sledge which contact with a limit breaker to change the cable drive direction.

8. A device according to claim 1, wherein the wheels are always maintained in contact with the bottom of the basin regardless of the position of the scraping blade.

9. A method for moving sludge along the bottom of a basin to a sludge hopper at one end of the basin in a device having a scraping blade being dragged in a forward direction along the bottom of the basin toward the hopper by a cable and cable drive means for scraping the bottom of the basin and depositing sludge in the hopper and the scrapping blade being returned to the opposite end of the basin for beginning another scraping cycle by reversing the cable and cable drive means direction, wherein the basin includes a guide, secured to and running substantially along the bottom middle longitudinal portion of the basin, which is in frictional engagement with a bottom side of a sledge, a carrier pivotally connected to said sledge on the top side thereof by axle means and being firmly connected with a scraping blade such that said carrier always maintains the blade perpendicular to the cable direction, a wheel being attached to each end of the scraping blade and each wheel having an axis of rotation which coincides with the axis of the axle means, said axle means, via the carrier, allows the blade to pivot about the sledge from a working position, in which the blade is in scraping contact with the basin bottom, to a return position, in which said blade is brought out of engagement with the basin bottom, and the cable drive means being connected to a holding point of the carrier by the cable means for causing, when the cable to be pulled in the forward direction, the scraping blade is first pivoted to its working position, because of the frictional engagement between the sledge and the guide, before it begins a scraping cycle, and when the cable is moved in the reverse direction the scraping blade is first pivoted to its return position, because of the frictional engagement, before it is returned for another scraping cycle, so that the position of the scraping blade can be changed at any desired location along the guide by only reversing the direction of the cable, said method including the steps of:

arranging a plurality of scraping blades in succession in the direction of the cable for simultaneously scraping, spacing the scraping blades from one another at a distance substantially equal to the basin length divided by the number of scraping blades, moving the scraping blades forward in their working position from a start position a distance greater than the spacing distance of the blades, and returning the scraping blades in their return position to their starting positions for another scraping cycle sufficient for the sludge to be progressively moved from scraping blade to scraping blade toward the sludge hopper.

* * * * *